United States Patent Office 3,694,153
Patented Sept. 26, 1972

3,694,153
LIQUID-LIQUID EXTRACTION PROCESS FOR THE PURIFICATION OF PHOSPHORIC ACID
Kenneth A. Williams, La Mirada, Calif., and David R. Stern, deceased, late of Fullerton, Calif., by Audrey E. Stern, executrix, Fullerton, Calif., assignors to Occidental Petroleum Corporation, Los Angeles, Calif.
No Drawing. Filed Oct. 30, 1970, Ser. No. 85,807
Int. Cl. C01b 25/18, 25/22
U.S. Cl. 423—321                                 15 Claims

ABSTRACT OF THE DISCLOSURE

Liquid water immiscible organic sulfonic acids are used to extract metallic impurities from crude phosphoric acid solutions containing up to 54% by weight $P_2O_5$, by a liquid-liquid extraction.

The organic sulfonic acids are particularly useful for extracting alkaline earth metals such as magnesium and calcium as well as iron.

The organic sulfonic acids are regenerated by contact with an inorganic acid such as sulfuric acid.

When the $P_2O_5$ content of the phosphoric acid solution is below about 30% the crude phosphoric acid may be subject to additional purification by contact with the water immiscible primary amine-solvent system, preferably, a solution of a water immiscible primary amine in a mineral spirits solvent. This additional treating operation removes organic colorants, additional ionic iron as well as aluminum, silicon, fluoride and sulfate ions. The primary amine-solvent system containing extracted impurities may then be reacted with an acid or an acidic alkali metal halide or an ammonium halide solution. This releases the impurities in a soluble state to waste. Regeneration of the primary amine in its free base form is then accomplished by contact with a base. Alternately, the primary amine-solvent system may be regenerated by direct contact with a base.

BACKGROUND OF THE INVENTION

Super phosphoric acid is rapidly becoming an important source of phosphorus pentoxide ($P_2O_5$) in fertilizer products. In recent years the growing popularity of liquid fertilizers has been attributed to the commercialization of wet process super phosphoric acid which represents a relatively inexpensive form of polyphosphates which are capable of sequestering troublesome metallic impurities that occur in wet process phosphoric acid. The most troublesome impurities are magnesium, aluminum and iron in that order.

The $P_2O_5$ concentration of super phosphoric acid has been, moreover, limited to about 70–76% by weight $P_2O_5$ due to the high viscosity of the acid as caused by sequestered metal impurities. Since the impurities place a limitation on $P_2O_5$ concentration, it also places limitation on polyphosphate content of the super phosphoric acid. This, in turn, limits the nature of the liquid fertilizer end products which may be produced.

The primary liquid fertilizer made from super phosphoric acid (72% $P_2O_5$) is a solution containing, by weight, 10% N:34% $P_2O_5$:0% K in which phosphorous pentoxide exists in solution as ammonium polyphosphate. The impurities present in this super phosphoric acid employed in the production of these liquid fertilizers lead to troublesome handling problems on storage due to gel formation and precipitation of solids such as $$MgAl(NH_4)_5H_2(PO_4)_4 \cdot 6H_2O$$

or magnesium ammonium orthophosphate.

A considerable quantity of the polyphosphate present are used to maintain metallic impurities, chelated, and the remainder form the ammonium polyphosphates. The polyphosphates are, hydrolytically unstable and begin to hydrolyze when placed in aqueous medium. They hydrolyze slowly, however, and give along term fertilizer availability. The chelated compounds, however, which form gels and precipitates are rapidly lost. Consequently, life of the liquid fertilizer is a function of the initial polyphosphate content that is present less the amount required to chelate the metallic impurities.

The polyphosphates have another important function. The liquid fertilizers must be stored under all-weather conditions and must survive low temperature winter storage without salting out. Solids that salt out at low temperatures are different from those which precipitate from hydrolysis. When the polyphosphate content is high, the product will have a low salt-out temperature.

In an effort to minimize sludge or gel forming materials in fertilizer products, such practices as selective mining of phosphate rock have been employed to minimize the impurity level in the feed acid to a super phosphoric acid plant. This technique, however, is costly and not entirely satisfactory.

SUMMARY OF THE INVENTION

It has now been found that metallic impurities, such as alkaline earth metals and iron, contained in impure aqueous phosphoric acid solutions containing up to about 54% by weight $P_2O_5$, such as wet process acid may be economically extracted by a liquid-liquid extraction process which involves contacting the aqueous phosphoric acid with a liquid organic sulfonic acid to form a liquid organic sulfonic acid phase containing extracted metals and a purified aqueous phosphoric acid phase then separating the two phases.

The water immiscible organic sulfonic acid used to extract the impurities is then regenerated for recycle by contact with an inorganic acid, preferably a mineral acid such as sulfuric acid.

Where the phosphoric acid contains less than about 30% $P_2O_5$, the process of this invention may also be used in conjunction with a second liquid-liquid extraction in which the aqueous phosphoric acid solution is contacted with a primary amine-solvent system comprising at least one water immiscible primary amine and a water immiscible organic solvent for the amine. This forms a primary amine-solvent phase containing organics as well as ionic iron, silicon, sulfate and fluoride impurities, and a phosphoric acid phase purified with respect to these impurities.

The water immiscible primary amine-solvent system may then be regenerated for recycle by contact with an acidic alkali metal halide or ammonium halide solution which causes the formation of a primary amine hydrohalide-solvent phase and releases the extracted impurities to waste to an aqueous phase in a soluble state. Primary amine is then regenerated by contact with a base, preferably an alkali hydroxide or ammonia.

Alternatively, the primary amine-solvent phase may be treated with a strong acid which causes the anion of the acid to exchange with the extracted impurities which are discarded as a soluble waste. Treatment with the base then regenerates the amine in its free base form.

Regeneration may also be achieved by direct treatment with the base.

The acid products produced in accordance with the practice of tihs invention may be water-white in quality and can be concentrated to as high as 80% by weight or more $P_2O_5$ with polyphosphate contents as high as 85% and without the formation of gels or precipitates.

DESCRIPTION

According to the present invention there is provided a process for the production of high purity phosphoric acid from impure phosphoric acid solutions containing up to about 54% by weight $P_2O_5$ such as wet process acid.

The basic process of the invention is essentially a closed loop liquid-liquid exchange process wherein the reagents used for purification of the phosphoric acid may be continuously regenerated for reuse and is based on the finding that water immiscible organic sulfonic acids will selectively extract metal impurities, particularly alkaline earth metals and iron impurities from crude phosphoric acid and that the liquid organic sulfonic acids used may be continuously regenerated for recycle by contact with an inorganic acid such as sulfuric acid.

The organic sulfonic acids which may be used, in accordance with the practice of this invention, for the extraction of metallic impurities from phosphoric acid are substantially water insoluble but soluble in water immiscible organic solvents. They may be obtained, in general, by conventional sulfonation techniques and may be derivative of alkyls, alkylaryls, polyalkylaryls and the like, as well as mixtures thereof, in which the total carbon atom content is at least about 14 carbon atoms, preferably from about 14 to 30 carbon atoms. Illustrative, but no wise limiting of the organic sulfonic acids there may be mentioned lauryl benzene sulfonic acid, bis-(dodecylphenyl methane) sulfonic acid, polydodecylbenzene sulfonic acid, diisopropyl benzene sulfonic acid, diisoamyl benzene sulfonic acid, dodecyl toluene sulfonic acid, sulfonic acid derivatives of alpha olefins, dinonylnaphthalene sulfonic acid, palmitic sulfonic acid, lauric sulfonic acid, tall oil sulfonic acid, linoleic sulfonic acid and the like, as well as mixtures thereof. Dinonylnaphthalene sulfonic acid is particularly preferred.

When the organic sulfonic acids are of low viscosity, they may be used directly in the treatment of impure phosphoric acid. In most instances, however, viscosity will be too high to promote fast phase separation, and the organic sulfonic acids are normally diluted with a suitable water immiscible organic solvent, usually to a level below about 2 centipoises.

Suitable water immiscible solvents include kerosene, mineral spirits, benzene, naphtha and xylene, toluene, nitrobenzene, carbon tetrachloride, chloroform, trichlorethylene and the like. Preferred solvents are high unsaturated hydrocarbons having a boiling point between 250° F. and 450° F.; flash points between 60° F. and 160° F. and viscosities between about 1.5 and 1.7 centipoises, and densities between about 0.7 and about 25 grams per cc.

The organic sulfonic acids used in accordance with the practice of the invention, as indicated, are particularly selective for extracting alkaline earth cations such as $Mg^{+2}$ and $Ca^{+2}$ as well as $Fe^{+3}$. There may, in addition, be removed some of the aluminum compounds which may be present and the impurity content of the resultant acid may be reduced to a level which permits concentration of $P_2O_5$ to 80% by weight at an increase of polyphosphate content to 85% by weight.

Purification operation is preferably carried out in a multicell countercurrent extractor wherein the crude acid is brought into contact with the water immiscible organic sulfonic acid which is partially loaded with respect to extracted impurities and then progressively brought into contact with a water immiscible organic sulfonic acid which is increasingly lean with respect to extracted impurities. This maximizes the extranctant ability of the organic sulfonic acid.

The use of a liquid organic sulfonic acid to extract impurities also minimizes, as compared to conventional solid ion exchange resins, the size of the equipment and the volume of material which is required for large scale operation.

Following the extraction operation, the water immiscible organic sulfonic acid is separated from the purified phosphoric acid solution by phase separation. The phosphoric acid is then concentrated by conventional means and the water immiscible organic sulfonic acid regenerated for recycle.

Regeneration is accomplished by contacting the water immiscible organic sulfonic acid containing the extracted metal impurities with an inorganic acid preferably a mineral acid. This results in an exchange reaction whereby the water immiscible organic sulfonic acid is returned to its active state and the extracted impurities passed to an aqueous phase in the soluble state for discarding to waste. Although inorganic mineral acids such as hydrochloric acids, sulfuric acid and dilute nitric acid may be used, it is preferred to use sulfuric acid.

The phosphoric acid solutions which may be treated in accordance with the practice of this invention are aqueous solutions generally produced by a wet acid process and containing up to about 54% $P_2O_5$ by weight, with most of the acids containing from about 1 to about 54% $P_2O_5$ by weight.

When the $P_2O_5$ concentration of the impure acid is below about 30% by weight the process of the practice of this invention may be combined with a further purification operation wherein additional iron and aluminum impurities are removed, in addition to, to the extent they are present, organics, sulfate fluoride, silicon ions and the like. This secondary purification operation is based on the use of water immiscible primary amine-solvents system comprising at least one water immiscible primary amine and a water immiscible organic solvent for the amine which have been found to attract and complex with cations such as iron and aluminum in addition to sulfate, fluoride, silicon, ions as well as organics which in the presence of the primary amine-solvent system behave as anions.

This treatment is also a closed loop liquid-liquid extraction process wherein the primary amine reagent is continuously regenerated by contact with an acid or an acidic alkali metal or ammonium halide solution followed by contact with a base or by direct contact with a base.

The primary amines which may be used are also substantially water insoluble but soluble in water immiscible organic solvents. The primary amines used contain at least about 7, and preferably from about 7 to about 25 carbon atoms in the hydrocarbyl group which can be saturated aliphatic, unsaturated aliphatic or aromatic in nature. Primary aliphatic branch chained amines containing about 24 carbon atoms are particularly preferred.

Illustrative, but no wise limiting, of the primary amines which may be used in practice of this invention, there may be mentioned octylamine, tert-octylamine, n-decylamine, tetradecylamine, n-hexadecylamine, coco-amine, tert-dodecylamine, octadecylamine, octadecenyl, octadecadrenyl amine, and the like, as well as mixtures thereof.

There may, for some systems, be included with the primary amine a water immiscible secondary amine such as, for instance, di-n-butylamine, di-i-butylamine, di-n-amylamine, di-i-amylamine, di-n-octylamine, di-n-nonylamine and the like.

As indicated, the primary amine extractants of this invention are employed in the presence of a water insoluble solvent for the amine. Suitable diluents are essentially the same as used for diluting the water immiscible organic sulfonic acids, with mineral spirits being preferred.

For some amines it may be desired to add a minor amount of an additive which increases the solubility of the impurities. Suitable additives include the water immiscible solvent, as well as water-insoluble alcohols such as monohydric aliphatic alcohols containing from about 6 to about 20 carbon atoms such as 1-hexanol, 4-methyl-2-pentanol, 2-octanol, 1-dodecanol, 1-teradecanol and the like. Other solubilizing additives such as tributyl phosphate and 1-fluorohexane may also be used.

The amine-solvent systems which may be used in accordance with the practice of this invention contain up to about 50 percent by volume amine, preferably about five to about fifteen percent by volume amine as solutions of higher amine concentration tend to become viscous. High viscosity, it has been found, tends to retard the rate of phase separation which must occur after the amine-solvent system has been used to extract impurities from dilute phosphoric acid.

The volume of the amine-solvent system used relative to the volume of the dilute phosphoric acid being treated during the purification operation will vary, in part, depending on the amount of impurities it is desired to remove and how much of phosphate values which are permitted to be extracted from the dilute acid during purification. In general, optimum results in terms of both low phosphate loss and low residual impurities in product acid, are obtained in an equivalent volumetric ratio of amine-solvent system to water from about 0.1 to about 0.7 when using an amine-solvent system when the amine concentration is from about 5 to about 15 percent by volume.

Following extraction of the organics and ionic impurities from the dilute phosphoric acid, the primary amine-solvent system used in the extraction is generally processed in a closed loop system for regeneration.

This is preferably accomplished by first contacting the amine with an acidic alkali or ammonium halide solution which causes the release of at least the extracted organic and ionic impurities by an exchange reaction in which there is formed an amine hydrohalide. The organic and ionic impurities leave the amine-solvent system in a soluble state for discarding to waste.

The acidic halide solutions which may be used for treatment of the amine-solvent system containing the organic and ionic impurities are solutions having a pH between about 1 and 4, preferably between about 1.5 and 2.5, and comprise one or more alkali metal or ammonium halides.

Illustrative, but no wise limiting, of the halide salts which may be present, there may be mentioned sodium chloride, potassium chloride, lithium chloride, ammonium chloride, potassium bromide, lithium bromide, sodium bromide, potassium fluoride and the like. For economic reasons, an acidic sodium chloride solution is preferred.

The primary amine hydrohalide is then reduced to its free base form for recycle by contacting the primary amine-solvent phase with at least a stoichiometric amount of a base, preferably an alkali metal hydroxide or ammonia. When an alkali metal halide is employed to strip the system of its impurities, it is preferred to use a base containing the corresponding alkali metal ions in regenerating the amine.

Alternately, the primary amine-solvent system containing extracted impurities may be treated with a mineral acid such as hydrochloric acid, sulfuric acid, dilute nitric acid and the like. The anions of the acid exchange with extracted impurities which are released to waste in a soluble state. The primary amine-complex is then reduced to its free base form by contact with a base.

When hydrochloric acid is used, the primary amine is converted to an amine hydrochloride. When sulfuric acid is used an amine sulfate is formed. Treatment with a base such as sodium hydroxide results in the formation of sodium chloride or sodium sulfate depending on the acid used.

When ammonia is used, there will be formed in the aqueous phase, ammonium chloride or ammonium sulfate which, like the sodium salts, may be recovered as a solid byproduct. If it is desired to recover the ammonia for recycle, it may be recovered for recycle by addition of calcium hydroxide.

Still another alternative is direct addition of a base to the primary amine-solvent system containing the extracted impurities. In this one step operation, the amine is reduced to its free base form and the impurities are released to the aqueous phase as basic salts which may appear as a solid precipitate.

As with the cationic extraction involving the organic sulfonic acids, this purification is also carried out on a multicell countercurrent extractor wherein the crude acid is first brought into contact with an amine-solvent system which is partially loaded with respect to organic and ionic impurities then progressively brought into contact with solutions which are increasingly lean with respect to extracted impurities.

In this purification operation, it is most unexpected that the primary amines which are normally anion acceptors selectively complex in some way with the metal cations such as iron and aluminum. The nature of this complexing is not understood. However, it is evident that the iron and aluminum behave as anions in the amine-solvent system for even upon addition of the acidic halide solution they leave the amine-solvent system as anions.

As indicated, phosphoric acids which may be treated in accordance with the practice of the process of this invention are acids which contain up to about 54% by weight $P_2O_5$. They may be produced by any conventional means such as the wet process wherein phosphate-bearing rock is leached by contact with a mineral acid such as hydrochloric acid, nitric acid or sulfuric acid.

The process of this invention is also useful for the purification of slimes acid which may be obtained by first thickening phosphate slime which is usually obtained as a solids concentration of about 3 to 5% or less by combining the slimes with an aqueous coagulant in a high shear mixer and feeding the resultant slimes to a thickener where the solids are allowed to settle to a 10–20% solids, and the clarified overflow recovered for reuse.

While any conventional coagulant may be used for thickening such slimes, superior results have been obtained using polymers of acrylamide sulfate and its hydrolysis derivatives. These polymeric coagulants are prepared in general by reacting acrylonitrile with sulfuric acid in the presence of water to form acrylamide sulfate, and the acrylic acid then polymerizing the acrylamide sulfate along or with other vinyl monomers in situ in the presence of vinylpolymerization catalyst such as sodium bisulfite. The resultant coagulant reaction may be used as such without further water removal to recover solids. The resultant coagulant reaction mass has also been found to act synergistically when combined with part of the phosphoric acid produced as a consequence of the leaching operation as combined coagulant-acid mixture appears to promote higher than normal rates and degrees of solids settling.

Once the slimes have thickened to about 10–20 or more percent solids they are leached with a mineral acid such as hydrochloric, nitric or sulfuric acid to produce a phosphoric acid solution which generally contains from about 1–2% $P_2O_5$. In this leaching operation higher than normal $P_2O_5$ yields per unit of acid may be obtained if only a stoichiometric amount of acid is used and if it is sought to extract less than all the $P_2O_5$ contained in the settled slimes.

In the leaching operation the slimes are filtered to yield phosphoric acid and a filter cake of high solids density which may be discarded to a mined out area. By addition of a polymeric coagulant, filter cakes as high as 35 percent by weight solids or more can be obtained in commercial filters and greater than 80 percent washing efficiency can be achieved in a single displacement wash.

The dilute phosphoric acid produced as a consequence of the leaching operation contains as impurities organics, fluoride, sulfate, aluminum, irons and silicon ions and is generally a liquor of yellow to light brown shade.

When treated using liquid-liquid extraction methods involving the organic sulfonic acid and primary amine-solvent purifications systems of this invention, the organic colorants as well as at least the magnesium, calcium, iron, fluoride, sulfate, aluminum and silicon ionic impurities are removed and a resultant acid rendered water-white for concentration to higher acid strengths.

The high purity acids produced in accordance with the practice of this invention offer several advantages. The use of purified acids containing 54–56% $P_2O_5$ offers several attendant advantages. This purity feed acid permits concentration to 80% or more by weight $P_2O_5$ with an increase in available polyphosphates to 85% by weight. A decrease in viscosity may also be realized to facilitate better handling characteristics. Shipping costs are also reduced because of higher concentrations making world-wide shipment feasible.

At high polyphosphate contents, higher assay liquid fertilizers such as 11% N-37% $P_2O_5$-0% $K_2O$ and 12% N-40% $P_2O_5$-0% $K_2O$ may be produced for field storage for longer periods of time than present liquid fertilizers made from impure super phosphoric acid.

Another area of particular utility is in the preparation of suspension fertilizers. To prepare suspension fertilizers, it is presently necessary to incorporate 1 to 3 percent clay by weight. The compositions range from 12% N-40% $P_2O_5$-0% $K_2O$; 15% N-15% $P_2O_5$-15% $K_2O$; 12% N-24% $P_2O_5$-12% $K_2O$ to 10% N-30% $P_2O_5$-10% $K_2O$. With the higher $P_2O_5$ and polyphosphate content, these suspensions may be made without the use of a clay suspension agent.

With the more notorious impurities easily and conveniently removed by the process of this invention, an added and important advantage is that only that portion of the process steam intended for the production of high purity acid need be diverted for purification. As a consequence, the process presents a flexible and selective method for purifying any concentration slimes and wet process acid for ultimate consumption as high purity acid.

While no wise limiting, the following are examples of the practice of the process of this invention.

EXAMPLE 1

Sixty volumes of a 37% by weight solution of dinonylnaphthalene sulfonic acid was diluted with 140 volumes of a mineral spirits solvent. One hundred volumes of the resultant solution was contacted with 100 volumes of a dilute phosphoric acid solution with agitation for three minutes. The phases were allowed to separate and the aqueous layer drawn off. The aqueous layer was then contacted, under agitation, with an additional 100 volumes of the prepared solution. The results of the two series extractions are shown in Table I.

TABLE I

|  | $P_2O_5$ | $F_2$ | $Fe_2O_3$ | $Al_2O_3$ | MgO | CaO |
|---|---|---|---|---|---|---|
| Original acid | 14.69 | 1.52 | 1.04 | 4.10 | 2.28 | 0.96 |
| After 1st pass | 14.05 | 1.26 | 0.60 | 2.80 | 0.18 | 0.23 |
| After 2d pass | 13.62 | 1.10 | 0.28 | 1.51 | 0.16 | 0.04 |
| Percent removed, total | 7.0 | 34.0 | 73.0 | 63.0 | 93.0 | 96.0 |

After use both solutions were combined and contacted with a stoichiometric quantity of sulfuric acid and regenerated. The waste aqueous solution was discarded.

EXAMPLES 2–4

The extractant system used in Example 1 was employed to treat several crude phosphoric acid solutions of varying $P_2O_5$ content. The extractions were single stage with intermediate regeneration of the organic sulfonic acid with sulfuric acid. The results are shown in Table II.

TABLE II

|  | Example | | |
|---|---|---|---|
| Component: | | | |
| $P_2O_5$: | | | |
| Before extraction | 55.6 | 28.9 | 28.2 |
| After extraction | 55.4 | 27.0 | 27.8 |
| Percent, extracted | 1.0 | 6.0 | 4.0 |
| CaO: | | | |
| Before extraction | 0.022 | 0.15 | 0.15 |
| After extraction | 0.018 | 0.12 | 0.9 |
| Percent, extracted | 18.0 | 20.0 | 40.0 |
| MgO: | | | |
| Before extraction | 0.27 | 0.19 | 0.19 |
| After extraction | 0.72 | 0.14 | 0.15 |
| Percent, extracted | 22.0 | 26.0 | 21.0 |
| $Fe_2O_3$: | | | |
| Before extraction | 0.91 | 0.851 | 0.851 |
| After extraction | 0.49 | 0.758 | 0.667 |
| Percent, extracted | 46.0 | 11.0 | 22.0 |
| $Al_2O_3$: | | | |
| Before extraction | 1.69 | 1.07 | 1.07 |
| After extraction | 1.63 | 1.01 | 0.99 |
| Percent, extracted | 6.0 | 6.0 | 8.0 |

EXAMPLE 5

A crude phosphoric acid having a pH of 1.6 was produced from settled slimes having a solids content of 24.3% and in which the $P_2O_5$ content of the solids was 12.34%. The slimes were acidulated with concentrated sulfuric acid. The $P_2O_5$ content of the aqueous solution after acidulation was 1.65%. The solution was treated with recycle dilute phosphoric acid to reduce solids content to 10% and a 0.1% polyacrylamide sulfate flocculant solution was added. The mixture was slowly agitated for thirty minutes. The solids were then allowed to settle and were separated by filtration, 100 volumes of the resultant solution was pumped by contact with volumes of a primary amine-solvent system consisting of 20% by volume of primary amine having an effective molecular weight between 350 and 400 and 80% by volume of an aromatic solvent. The resultant acid was water-white and no turbidity was observed. The impurities content of the acid before and after treatment are listed in Table III.

TABLE III

|  | Percent by weight | |
|---|---|---|
|  | Crude acid | Purified acid |
| Impurities: | | |
| $SO_4^-$ | 0.013 | 0.00 |
| $F^-$ | 0.37 | 0.01 |
| $Al_2O_3$ | 0.40 | 0.00 |
| $Fe_2O_3$ | 0.081 | 0.0003 |
| CaO | 0.05 | 0.012 |
| MgO | 0.43 | 0.035 |

What is claimed is:

1. A process for the extraction of metal impurities from aqueous phosphoric acid solutions containing up to about 54% by weight $P_2O_5$ which comprises:
   (a) contacting impure aqueous phosphoric acid solution with at least one water immiscible liquid organic sulfonic acid, said organic sulfonic acid being a sulfonic acid derivative of at least one hydrocarbon containing at least about 14 carbon atoms and selected from the group consisting of alkyls, alkylaryls and polyalkylaryls, to form:
   (i) a liquid organic sulfonic acid phase at least containing extracted metal impurities selected from the group consisting of alkaline earth metals and iron; and
   (ii) a purified aqueous phosphoric acid phase;
   (b) separating the purified aqueous phosphoric acid phase from the liquid water immiscible sulfonic acid phase.

2. A process as claimed in claim 1 in which the hydrocarbon contains from about 14 to about 30 carbon atoms.

3. A process as claimed in claim 1 in which the liquid water immiscible organic sulfonic acid is dinonylnaphthalene sulfonic acid.

4. A process as claimed in claim 3 in which the dinonyl naphthalene sulfonic acid is diluted with mineral spirits.

5. A process as claimed in claim 1 in which the phosphoric acid solution contains up to about 30% by weight $P_2O_5$.

6. A process as claimed in claim 1 in which the liquid sulfonic acid is regenerated by:
   (a) contacting the liquid water immiscible sulfonic acid phase containing extracted metal impurities with a mineral acid to form:
      (i) a reactivated liquid water immiscible sulfonic acid phase, and
      (ii) an aqueous phase containing extracted metal impurities
   (b) separating the reactivated liquid water immiscible sulfonic acid phase from the aqueous phase.

7. A process as claimed in claim 6 in which the mineral acid is sulfuric acid.

8. A process as claimed in claim 5 in which the liquid water immiscible sulfonic acid is regenerated by contacting the liquid sulfonic acid phase containing extracted metal impurities with a mineral acid.

9. A process as claimed in claim 8 in which the mineral acid is sulfuric acid.

10. A process as claimed in claim 1 in combination with the steps of removing, as additional impurities, varying combinations of organics and iron, silicon, aluminum, sulphate and fluoride ions by:
    (a) contacting the impure aqueous phosphoric acid solution with a quantity of a primary amine-solvent system containing up to about 50 percent by volume primary amine and comprising at least one water immiscible primary amine containing from about 7 to about 25 carbon atoms and a water immiscible organic solvent for said amine sufficient to form:
       (i) a primary amine-solvent system phase containing extracted impurities selected from the group consisting of organics and ionic iron, aluminum, silicon, sulfate and fluorine, and
       (ii) an aqueous phosphoric acid phase purified with respect to said impurities;
    (b) separating the primary amine-solvent system phase containing the extracted impurities from the purified aqueous phosphoric acid phase.

11. A process as claimed in claim 10 in which the primary amine-solvent system contains from about 5 to about 15% by volume primary amine.

12. A process as claimed in claim 10 in which the volume ratio of the primary amine-solvent system to impure phosphoric acid is from about 0.1 to about 0.7.

13. A process as claimed in claim 10 in combination with the steps of regenerating the separated primary amine-solvent system by:
    (a) contacting the primary amine-solvent system phase containing extracted impurities with an acidic halide solution containing at least one halide selected from the group consisting of alkali metal halides and ammonium halides to form
       (i) a primary amine hydrohalide-solvent system phase; and
       (ii) an aqueous waste phase containing the extracted impurities in a soluble state;
    (b) separating the primary amine hydrohalide-solvent system phase for the aqueous waste phase;
    (c) regenerating the primary amine-solvent system by contacting the primary amine hydrohalide-solvent system phase with a base selected from the group consisting of alkali metal hydroxides and ammonia.

14. A process as claimed in claim 13 in which the acidic halide solution has a pH between from 1 to about 4.

15. A process as claimed in claim 13 in which the acidic halide solution has a pH of from about 1.5 to about 2.5.

References Cited

UNITED STATES PATENTS

| | | | |
|---|---|---|---|
| 2,288,752 | 7/1942 | Simpson | 23—165 |
| 3,458,282 | 7/1969 | Koerner et al. | 23—165 |
| 3,479,139 | 11/1969 | Koerner | 23—165 |
| 3,297,401 | 1/1967 | Sakomura et al. | 23—165 |
| 3,361,527 | 1/1968 | Hinkebein et al. | 23—165 |

FOREIGN PATENTS

| | | | |
|---|---|---|---|
| 1,553,095 | 11/1969 | France | 23—165 |
| 539,641 | 11/1931 | Germany | 23—165 |

OSCAR R. VERTIZ, Primary Examiner

G. A. HELLER, Assistant Examiner

U.S. Cl. X.R.

23—312 P

PO-1050
(5/69)

UNITED STATES PATENT OFFICE
CERTIFICATE OF CORRECTION

Patent No. 3,694,153            Dated Sept. 26, 1972

Inventor(s) Kenneth A. Williams et al

It is certified that error appears in the above-identified patent and that said Letters Patent are hereby corrected as shown below:

In the specification, col. 2, line 65 "tihs" should read --this--. Col. 3, line 66 "extranctant" should read --extractant--. Col. 7, line 8 before "purity" insert --high--. Col. 7, line 32 "steam" should read --stream--. Col. 7, line 56, Table I, the heading "$F_2$" should read --$F^-$--. Col. 8, Table II, under heading reading CaO After extraction, 3rd column "0.9" should read --0.09--, Table II, under heading reading MgO, After extraction, 1st column, "0.72" should read --0.27--. Col. 8, Table III, under the heading reading Impurities "$SO_4^-$" should read --$SO_4^=$--.

Signed and sealed this 20th day of February 1973.

(SEAL)
Attest:

EDWARD M. FLETCHER, JR.
Attesting Officer

ROBERT GOTTSCHALK
Commissioner of Patents